United States Patent [19]

Hurst

[11] 4,393,415
[45] Jul. 12, 1983

[54] TIME CHANGING SYSTEM FOR VTR

[75] Inventor: Robert N. Hurst, Cherry Hill, N.J.

[73] Assignee: RCA Corporation, New York, N.Y.

[21] Appl. No.: 201,436

[22] Filed: Oct. 28, 1980

[51] Int. Cl.$^3$ .................... H04N 5/78; G11B 15/46
[52] U.S. Cl. .................................. 360/9.1; 358/346
[58] Field of Search .............. 360/9, 10, 11, 14, 10.1, 360/10.3, 11.1, 14.1; 358/127, 128.5, 128.6, 312, 313, 320, 321, 323, 324, 335, 337, 338, 346, 348, 244.1, 244; 364/174, 183

[56] References Cited

U.S. PATENT DOCUMENTS

| | | | |
|---|---|---|---|
| 3,571,502 | 3/1971 | Law | 360/9 |
| 3,723,644 | 3/1973 | Haskell et al. | 360/9 |
| 3,944,728 | 3/1976 | Ferrari | 360/9 |
| 4,139,867 | 2/1979 | Foerster | 360/10.3 |
| 4,150,397 | 4/1979 | Russell | 360/9 |
| 4,167,023 | 9/1979 | Bessette et al. | 360/9 |
| 4,283,736 | 8/1981 | Morio et al. | 358/313 |

FOREIGN PATENT DOCUMENTS 55-56779  4/1980  Japan ........................... 360/9

OTHER PUBLICATIONS

"Television Digest," Sep. 15, 1980, p. 14.

Primary Examiner—Raymond F. Cardillo, Jr.
Assistant Examiner—Donald McElheny, Jr.
Attorney, Agent, or Firm—E. M. Whitacre; W. H. Meise; H. I. Steckler

[57] ABSTRACT

Apparatus for controlling the playback speed of a VTR features an accurate speed control signal. The reproduced signal is resynchronized to a standard speed by repeating or deleting frames when successive frames are substantially identical. In addition, or as an alternative, frame averaging can be used. Provision for real time entry is made to minimize human error. Application of the invention to both quadruplex and helical scan machines is shown.

10 Claims, 11 Drawing Figures

TIME CHANGING SYSTEM FOR VTR

BACKGROUND OF THE INVENTION

The present invention relates to video tape recorders (VTR), and more particularly, to a system for changing the duration of playback time of a fixed length segment of recorded tape.

Television broadcasters normally receive prerecorded programs that are of a fixed length, thus leaving only a certain amount of time from a fixed time slot, of, e.g., ½ or 1 hour, for advertisements. If the broadcaster receives orders for advertisements that exceed in time the time remaining for advertisements, at least one advertisement must be rejected, which results in a loss of revenue. Further, television production companies find that when assembling a video tape recording during an editing step, a segment frequently must be added to a prerecorded tape, which segment is frequently too long or too short to fit into the time segment alloted to it. If the segment is too long, it is corrected by deleting from either the dropped-in segment or the prerecorded tape. If the segment is too short, it is difficult to correct. The result is a loss of artistic integrity of the work.

It is known to speed up or slow down a tape manually such as in the so-called "Moviola" technique. However, this technique is unsuitable for broadcast use since the tape speed is not known and the quality of reproduction is inadequate. For these reasons, this technique is used only for tape editing.

It is therefore desirable to have a system that prevents a loss of revenue to broadcasters and/or loss of artistic integrity of a program by enabling time changing (lengthening or shortening) of a prerecorded program. Further, it is desirable to carry out the time changing with a minimum of human error, and with a minimum of visible effects.

SUMMARY OF THE INVENTION

A method and apparatus for controlling the playback speed of a video tape recorder, comprises generating a signal having a frequency in accordance with a selected playback speed, applying said signal as a reference signal to a servo circuit, providing an output signal from said servo circuit for control of said playback speed, and converting the reproduced signal to conform to a selected standard. Real time entry is provided in one embodiment to minimize human errors. Frame dropping and repeating are carried out when substantially identical frames are present or frame averaging is used to minimize visible effects.

DETAILED DESCRIPTION

Figure 1:
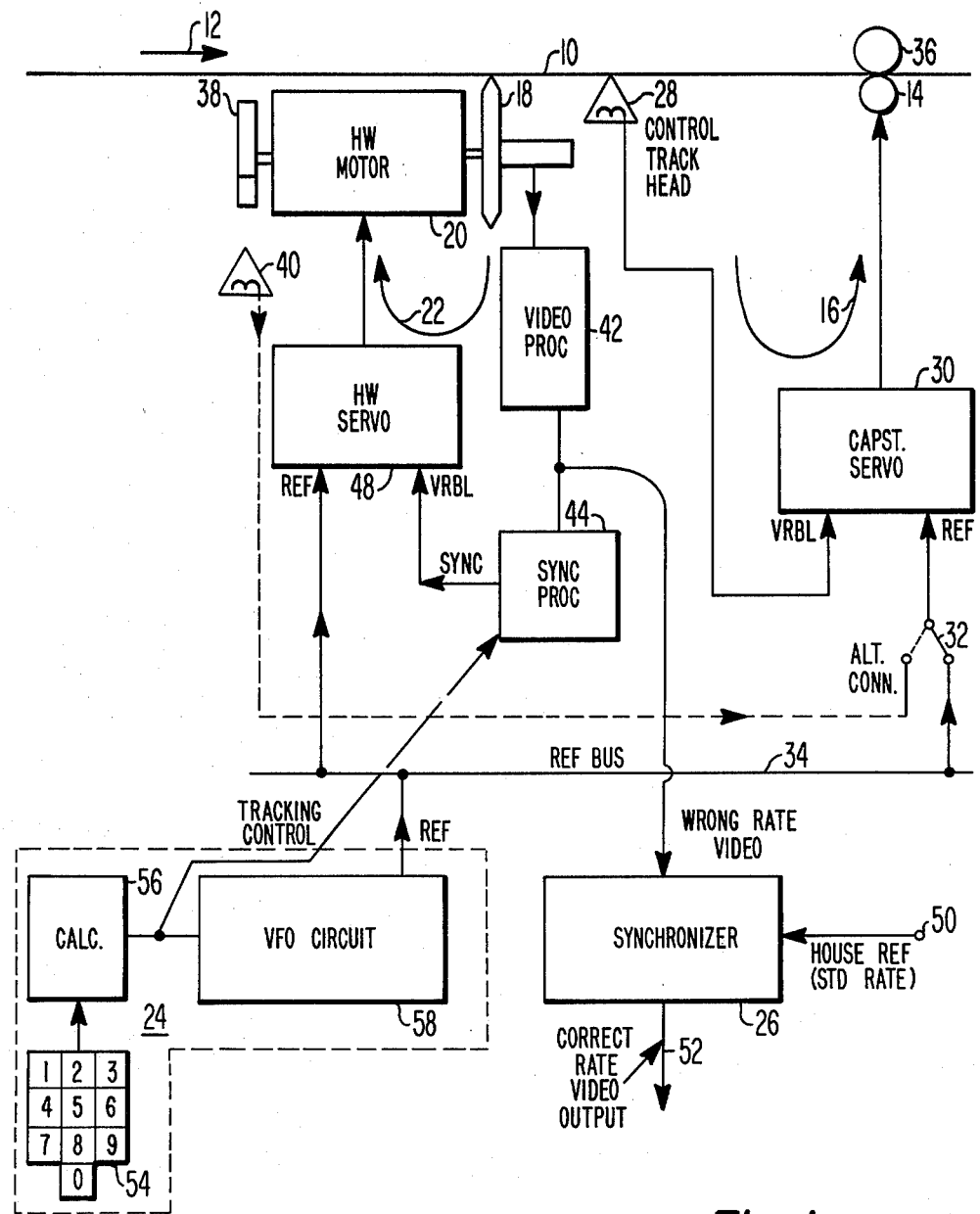
FIG. 1 is a block diagram of a first embodiment of the invention.

FIG. 1 shows a tape 10 that moves in the direction of arrow 12 due to the capstan motor 14. Motor 14 is speed regulated by control loop 16. A headwheel 18 has playback heads (not shown) mounted thereon to derive video information from tape 10. Headwheel 18 is driven by a headwheel motor 20 that is speed regulated by another servo control loop 22. The speed of motors 14 and 20 is determined by a speed control circuit 24. Since this speed is not necessarily a standard speed, a synchronizer 26 is used to convert the playback video to standard, e.g., NTSC line and field rates.

Now examining FIG. 1 in more detail, the tape 10 has FM (frequency modulation) recorded thereon video information in slanted tracks, and control and audio information in AM (amplitude modulation) recorded in separate longitudinally disposed tracks along the edge thereof, all as known in the art. The control track signal typically has a frequency of 240 Hz, and said control signal is reproduced by a control track playback head 28. The reproduced control signal is applied to capstan servo 30. Also applied to servo 30 through switch 32 is a reference frequency signal (described in more detail below) present on reference bus 34. The control track and reference control signals do not normally have even the same nominal frequency so the frequency of at least one of these signals must be changed either by multiplication or division in servo 30 before any frequency comparison can be done. After this frequency changing operation, the frequencies are compared, and any frequency or phase differences are used to generate an error signal that is used to control the speed of capstan motor 14, which motor drives tape 10 with the aid of pinch roller 36. Headwheel motor 20 has coupled to it a tonewheel 38 that alternately interrupts and passes a light beam (not shown) directed at photodetector 40. Thus tonewheel 38 and photodetector 40 form a tachometer for motor 20. The output of photodetector 40 is applied to a terminal of switch 32, where it can be selected as the reference signal for servo 30 instead of the reference signal on bus 34. In this case, it may be necessary to use a different frequency multiplier division quotient in servo 30 in order to be able to carry out the required frequency comparison therein. Control of the capstan servo 30 by the tachometer, rather than by reference bus 34, has the advantage that, if the reference frequency is incorrect, the heads of headwheel 18 will remain on the recorded tracks.

As is conventional in the art, headwheel motor 20 drives the headwheel 18, which headwheel has four playback heads (not shown) uniformly disposed around its periphery and engaging tape 10. Tape 10 is disposed in an arcuate guide (not shown) opposingly disposed with respect to headwheel 18 to ensure contact between the playback heads and tape 10 over a selected arc. Each of the playback heads reproduces a different segment of a video signal. Each segment is about sixteen lines in duration, and the segments are sequentially reproduced as headwheel 18 rotates. The video signal is applied to video processor 42, where the signal is first preamplified for maximum signal to noise ratio. The video signal is then equalized to compensate for the recording characteristics of the recording head and tape 10. Thereafter, the signal is FM detected and finally the effects of head switching transients are suppressed. The detected video signal from circuit 42 is applied to synchronizer 26 as well as to a sync processor 44. Processor 44 "cleans up" the horizontal sync pulses present in the recorded video, such as by amplitude limiting to ensure that all sync pulses have the same amplitude and by gating to eliminate passing on transients which occur in the middle of a line. The gating operation is achieved by having an automatic frequency controlled (AFC) oscillator in processor 44 generate a gating pulse that commences just before the occurrence of the horizontal sync pulse. The cleaned-up sync pulses are then applied to a headwheel servo 48. The reference signal present on reference bus 34 is also applied to servo 48. As in capstan servo 30, frequency multiplication or division operation on at least one of the signals applied to servo 48 may be needed in order to compare the two signals. The two signals, reference and horizontal sync, are frequency compared within servo 48, and an error signal is generated to control the speed of headwheel motor 20.

The video signal from processor 42 will not necessarily conform to a standard, be it NTSC or otherwise, and therefore a wide range synchronizer 26 (to be described below) receives "House Reference" synchronization signals conforming to a selected standard at input 50 from a master sync generator (not shown) and supplies an output conductor 52 the video information recorded on tape 10 in accordance with the selected standard, e.g. NTSC, PAL, etc. If the playback rate is higher than a selected standard rate, in order to compress the playback time, then synchronizer 26 drops frames as required; if the playback is at lower than a standard rate to time-stretch the tape segment, frames are repeated by synchronizer 26 as required Speed control circuit 24 comprises a keyboard 54 for receiving manually entered information as to the present and desired durations of a video segment. This information is provided to a process calculator 56, where the ratio of said durations is calculated. Calculator 56 can therefore comprise a decoder for decoding the information from keyboard 54 and an arithmetic logic unit (ALU) for calculating the ratio. A signal representing said ratio is applied to VFO (variable frequency oscillator) circuit 58 as well as to sync processor 44. The ratio representative signal is applied to processor 44 to ensure that the AFC oscillator therein tracks changes in sync and subcarrier frequencies. VFO circuit 58 may comprise, as known, as phase-locked loop circuit having a frequency determining programmable divider whose divisor is controlled by the signal from calculator 56. Therefore, VFO 58 produces for application to reference bus 34 a signal having some reference frequency, such as the horizontal sync frequency or the color burst frequency, multiplied by said ratio for control of servos 30 and 48. Thus, tape 10 and headwheel 18 will be driven by motors 14 and 20, respectively, faster or slower than normal in accordance with said ratio to speed up or slow down the playback operation as desired. As explained above, synchronizer 26 will supply a video signal conforming to a selected television standard by adding or dropping frames as required. It should be noted that the Moviola arrangement does not have such a frequency in accordance with the selected playback speed for application as a reference signal to a servo circuit.

Figure 2A:
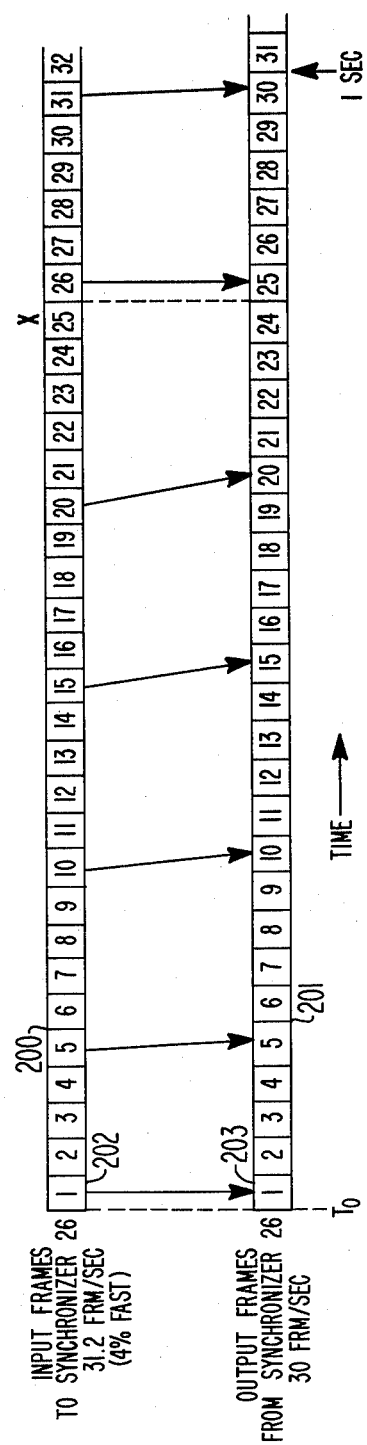
FIGS. 2(a), (b), and (c) are diagrams showing time relationships between input and output frames.

If a given program is being shortened, for example, by 4%, then it will be necessary to drop four out of every 100 frames; i.e., every 25th frame. FIG. 2(a) shows a representation of this operation. The upper line 200 shows the fast-running video tape recorder's output frames which are the input signal of synchronizer 26, which signal 200 at a 4% rate increase produces 31.2 frames per second. The desired output signal on the lower line 201 shows a standard NTSC 30-frames-per-second output signal to be made by synchronizer 26 from the 31.2-frame-per-second input signal 200.

Choosing an input and output pair of frames 202 and 203, which have coincident starting times at a time and arbitrarily calling them both frame 1, we see that as time progresses, the output frame starts later and later in relation to its correspondingly numbered input frame. It is still possible, for example, to make output frame 12 from input frame 12, but input frame 12 must be stored for about half a frame (1/60th sec. in NTSC) before it can be read out as output frame 12.

As the time error between input frames and correspondingly numbered output frames accumulates, it is necessary to store the input frame longer and longer before it can be used as an output frame. Finally, (for the case of 4% fast rate), input frame 24 is stored for the duration of an entire frame time before it can be supplied at the output of synchronizer 26. Therefore, all during input frame 25, the memory of synchronizer 26 is in use storing input frame 24. By the time the memory is ready for a new input frame, frame 26 is coming in. This is read from the memory as fast as it arrives, and becomes frame 25 of the output signal. Thus, input frame 25 was completely ignored, and was therefore dropped as indicated by an "x" in FIG. 2(a), As explained above, when a 4% shortening of a program is being carried out, every 25th frame will be dropped. Since there are 30 frames per second, a frame drop will occur every 25/30th of a second, or 0.833 second. If the picture is stationary, the drop will be invisible. If there is intermittent motion, the drop may or may not be noticeable, depending on when the drop occurs, and the nature of the motion. If the motion is regular and continuous, e.g., a turning wheel, the picture will "twitch" at every frame drop, producing a possibly objectionable effect.

Basically, there are two approaches to making the frame drop less visible. Both require additional memory, that is, more memory than is normally found in a simple synchronizer.

In the first technique, which will hide the "twitch" only for small or occasional motion, enough memory is added to permit the postponement of a frame drop or repeat. A motion sensor, compairing successive frames, can sense the similarity of successive frames, and wait for similar frames to occur before allowing the drop. Of course, the drop cannot be postponed too long, so this technique might allow perceptible effects when processing continuous rapid motion.

In the second technique, which will lessen the visibility of the "twitch" for any motion, several successive frames are stored, and the output of said frames is averaged, element by element. This averaging action will make no change to a motionless element, but moving elements will be softened and spread over the motion range for those frames. At the time of a drop, this averaged output is used as the system output; this makes moving objects less definite in their apparent location and thereby minimizes the visibility of any drop-induced motion discontinuity.

In a synchronizer employing a single frame of storage capacity, the frame drop is required whenever the memory is exhausted. Stated another way, the frame drop is forced from the fact that the first picture element stored of, e.g., frame 24, is not read out until just before frame 26 arrives. As in all devices of this class, (i.e., Time Base Correctors, of which a frame store synchronizer is a special case), it is the "pause" time that determines the extent of time correction available, viz., how long the memory may pause and hold its contents before the memory must be employed to remember something different, such as the next frame.

If we were to have two frames of storage capacity in a synchronizer, a 4% time change would call for a frame drop at a 1.66 sec. rate, half as often as for the single-frame store capacity synchronizer, but the drop would be twice as noticeable (if there were motion) since it would be a two-frame drop instead of a single frame.

Note that the addition of 0.033 sec. (one additional frame) of memory capacity allows the drop to be postponed 0.833 sec., which is 25 times as long as the amount of memory that was added (at the 4% rate). If the required time change were only 1%, the drop would occur every one hundred frames (3.33 sec. for a single frame of storage), and adding another frame of storage capacity to the memory allows a two-frame drop every two hundred frames. This is a hundred-to-one more postponement time than the time represented by the added 0.033 sec. of memory capacity. In general, if the time change rate is r (e.g., r=0.04 for 4% change), and the added memory is $T_{mem}$ seconds, the drop may be postponed by the time $T_{post} = T_{mem}/r$.

If, for example, it is desired that the system is to handle as much as a 5% time change, and it is assumed that, on the average, the scenes processed will settle to virtual motionlessness every 2.5 seconds, then $T_{mem}/r$ must equal 2.5, and $T_{mem} = 2.5 \times 0.05$, which is 0.125 seconds of additional memory required. This is slightly under four frames of additional memory capacity.

If the postponement time made available by the additional memory capacity is used up before an identical pair of frames if found, the drop must be allowed, and the consequences endured.

The amount of added memory capacity may theoretically be any amount from one sample of a digital video signal up to an unlimited amount. However, consideration of the structure of the NTSC color signal makes a four-frame memory optimum for the minimum memory as explained below. Increments of two frames thereafter—6, 8, 10 ... etc. ... frames—continue to offer attractive advantages, so the four-frame system will be described. The structure of the other embodiments will be made obvious by the description of the four-frame system.

Very briefly, the action of the four-frame memory in eliminating motion discontinuities is as follows: the first two frames of memory capacity are used in a normal synchronizer, but with two additional frames of storage available. Thus, a 4% speed change would drop two of every 50 frames. However, at the drop point—49 and 50—the drop action does not take place. Instead, the synchronizer action continues, using the third and fourth frames of memory capacity for storage.

Now, address comparators which have been continuously monitoring the read and write addresses note that read and write are now separated by more than two frames, and a motion sensor is interrogated constantly thereafter in a search for substantially identical frames. If a substantially identical pair is found, then the read address is immediately switched to read two frames away from the previous read location. This passes over two frames in memory, thereby dropping them. Although it is a two-frame drop, it is made by switching between the two frames that have been verified as substantially identical by the motion sensor, and therefore no motion discontinuity can be seen.

Figure 3:
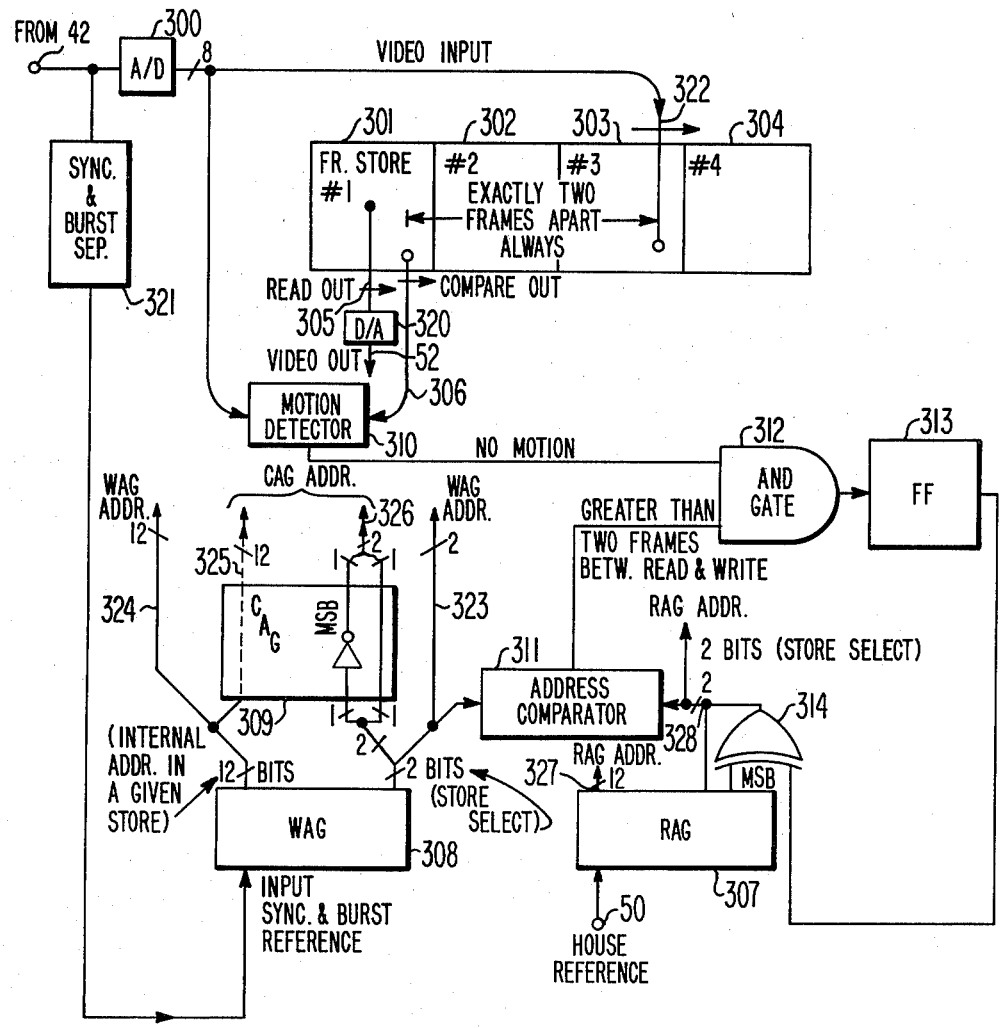
FIG. 3 is a block diagram of a synchronizer used in FIG. 1.

FIG. 3 is a block diagram representing synchronizer 26 of FIG. 1, arranged to carry out the above-described operations. Here, analog video information from processor 42 is applied to a sync separator 321 that applies vertical and horizontal sync and color burst to generator 308. The analog video signal is also applied to analog to digital converter (A/D) 300. The resulting digital video signal is, e.g. an eight-bit one (256 grey levels), and is supplied to an arrangement of four frame stores 301, 302, 303 and 304 via scanning input path 322 and is written into them in sequence, storing four frames in the four stores, respectively. At the same time, video information is being read out of the frame stores in two paths; a scanning read path 305 (used as the main video output 52 after conversion by digital to analog converter 320), and a scanning compare path 306 (used as part of the motion detector scheme). It is important to note that the video input path 322 and the compare output path 306 are exactly two frames apart in time at all times; i.e., as video input path 322 sequentially scans stores 301, 302, 303 and 304, compare path 306 sequentially scans the same frame stores, but at a time displacement of exactly two frames.

In the NTSC system, every other color frame is identical, if there has been no motion. (Adjacent color frames have reversed subcarrier phases with respect to the horizontal sync pulses). Therefore, a motion detector 310 can be made by exclusive ORing the corresponding video bits coming from the video input path 322 and compare path 306. If all 8 bits are used for the exclusive ORing comparison, the motion detector would be too sensitive. Usually, only the most significant 4 bits (MSB) are used; the 4 LSB (least significant bits) are more than 30 db down in importance. Motion detection is known in the art.

The locations for reading and writing are determined by a RAG (Read Address Generator) 307 and a WAG (Write Address Generator) 308, respectively. A CAG (Comparison Address Generator) 309 is added to obtain the comparison output signal. RAG 307 is controlled by house reference sync at input 50. WAG 308 is controlled at the rate of the incoming signal, via separator 321.

In the prior synchronizer art, a typical WAG or RAG would supply about 12 bits of address, to locate where the writing should take place within the frame store. In the present system, the same 12 or so bits are required, for the same purpose, but an additional two bits on 2-bit bus 323 are needed to determine if the writing is to be in store 301, 302, 303 or 304. These are the most significant bits of the entire addressing system.

The 12 bits of the CAG and the WAG on buses 325 and 324, respectively, are identical, since they are reading and writing, respectively, precisely two frames apart in their respective frame stores of the moment. Only the two store select buses 326 and 323 of the CAG and WAG, respectively, are different.

Figure 2B:
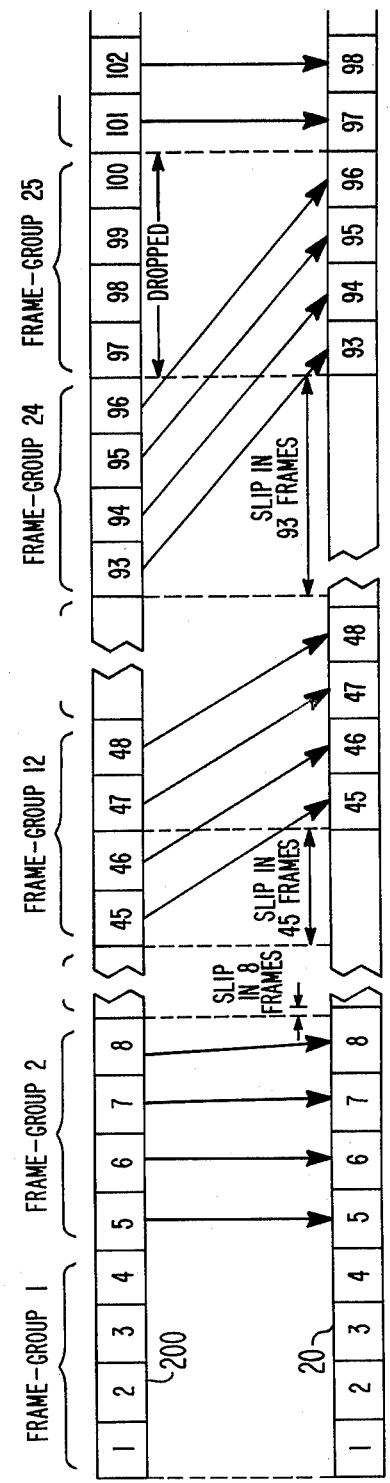

FIG. 2(b) represents the operation of a four-frame-store synchronizer, the representation being parallel to the representation of the single-frame-store synchronizer of FIG. 2(a).

As before, assume that at some point in time, the input and output signals will line up in time, and the two frames that are initially aligned are arbitrarily identified as frame 1 for both input and output video signals.

If we assume, for example, that the input frame rate is 4% higher than the desired output frame rate, then the initial alignment of the frames 1 (input and output) will gradually slip, as time progresses, just as it did in FIG. 2(a). However, the synchronizer whose action is represented by FIG. 2(a) has only one frame of memory available. This memory (when the difference in frame rate is 4%) will be used up in 25 frames and, therefore, a frame drop must occur, as indicated in FIG. 2(a). In the system represented by FIG. 2(b), however, there are four frame stores available; these will not be used up (at the 4% rate) until 100 frames have passed. Therefore, the frame drops will occur one-fourth as often, but, since the frames will be dropped in four frame groups, any motion discontinuity resulting from the drop will be much more visible than in the case represented by FIG. 2(a).

The dropping of a four-frame group is indicated at the right of FIG. 2(b). By the time frame 93 is ready for readout, the entire memory is being used to hold the frames waiting to be delivered to the read line 305. Therefore, when frame 97 arrives at the input there is no place to store it, or the succeeding frames 98, 99 and 100. When all of the frame stores 301, 302, 303 and 304 finally release their contents to read line 305 (as output frames 93, 94, 95, 96) then input frame 101 is arriving and ready to be stored. This input frame 101 goes into frame store 301, and is read out as output frame 97. As FIG. 2(b) indicates, the remaining frames 98, 99 and 100 of frame-group 25 had no storage room, either; they are dropped, and input frames 102, 103 and 104 are placed into stores 302, 303 and 304, respectively, and these are read out as output frames 98, 99 and 100. Thus, a four-frame drop has taken place, and the input and output frames are again aligned (as they were at both of frames 1), and the above-described action can commence again.

Although the use of a four-frame-store synchronizer allows the postponement of the drop by a factor of four, the visibility of the drop (as a motion discontinuity) is much higher and more objectionable; hence the operation of a four-frame-store synchronizer as indicated in FIG. 2(b) is not an acceptable solution. It is one of the goals of this invention to describe a means by which a four-frame synchronizer can be used to provide an invisible frame drop, provided that sometime during a selected interval (such as 100 frames, for the case of a 4% rate differential) a pair of frames may be found which are substantially identical.

To show how this may be done, refer to the middle group of frames (45, 46, 47 and 48) of FIG. 2(b). At the 4% frame-rate difference chosen as an example, the slip between input and output will have an accumulated time difference of two frames, as indicated in the FIGURE. At this time, a given frame is being stored for at least two frames before being read out. This gives us time to compare two NTSC frames with identical subcarrier phase relationships and determine if the frames are substantially identical. Therefore, starting at the point where half the memory has been used (that is, the read and write are at least two frames apart) one begins searching for a pair of substantially identical frames.

Figure 2C:
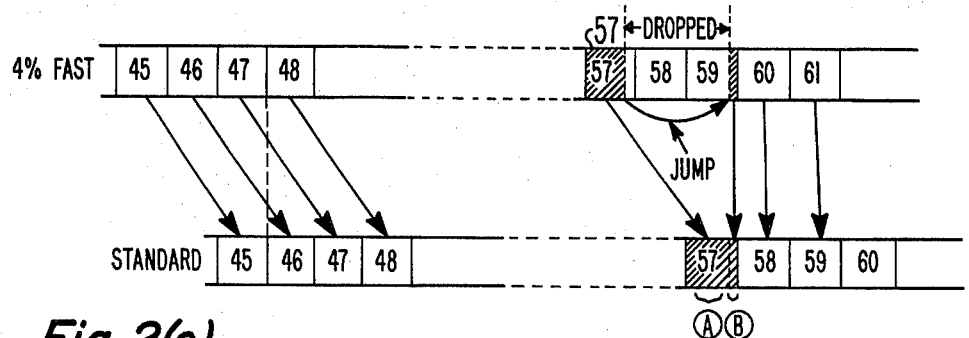

FIG. 2(c) represents the action of the synchronizer when two substantially identical frames are found, and shows how this results in a motion-discontinuity-free frame drop.

At the start of the action, frame 57 (for example) which was stored more than two frames ago, is being read out on the read output line 305, and frame 59 is being written, i.e. read in and write out are more than two frames apart. The timing between input and output is such that the writing of 59 is going to be completed before the reading of 57 is completed. This is an obvious consequence of the fact that input and output are more than two frames apart. At the same time, frame 57 is being read by the compare circuits, in exact synchronism with the writing of frame 59, exactly two frames apart. At the conclusion of the writing of frame 59, the circuitry possibly concludes that frame 59 and frame 57 were substantially identical (through the comparison of the write input to frame 59 and the comparison of output from frame 57), and the reading of frames 57 is immediately interrupted in midframe, and the reading of frame 59 at the corresponding point is commenced. This is a jump from frame 57 to frame 59 in mid-frame. This jump is invisible, however, since frame 57 and frame 59 are known to be substantially identical. The output frame 57 is therefore made in part from input frame 57, and part from input frame 59 as shown by the shaded areas in FIG. 2(c). Exactly two frames of input information—part of frame 57, all of frame 58, and part of frame 59—were dropped.

With this as a background, refer again to FIG. 3, and assume that the action shown in FIG. 2(c) is taking place. Address comparator 311 determines that reading and writing are more than two frames apart by comparing the MSBs of the WAG 308 and RAG 307. This information is applied to and AND gate 312, which gate 312 is also monitoring the output of the motion detector 310. If a no-motion situation is detected, indicating that the write and compare frames are substantially identical, AND gate 312 causes a change in state of flip-flop 313, which flip-flop 313 drives exclusive OR gate 314, thereby reversing the polarity of the RAG MSB which is passing through said gate 314. This complementing of the address MSB causes the read location to jump by exactly two frames, i.e. from store 301 to store 303, thereby causing a two-frame drop. However, this causes no motion discontinuities, since the jump was made between two frames determined substantially identical by the motion detector 310.

The same system works for a slower-than-normal (30 frames/sec.) video input signal. In this case, the two-frame address difference will cause the READ location to jump back to stored video which it has already read; two frames are therefore repeated.

The system just described gives perfect junctures, i.e. no "twitch" at the drop or repeat point; the limitation lies in the time in which it must be accomplished. The system described below has no time limitation. However, it is less than perfect, in that it does not give perfect junctures, but never provides abrupt junctures (large "twitches").

The averaging approach to alleviating motion discontinuities is based on the relative ease with which digital video signals may be averaged, on the psychophysical effect that the eye sees less detail in moving objects, and on the use of frame stores to perform this averaging in all directions.

Averaging two decimal numbers is done by adding the numbers and dividing by two. Averaging two binary numbers is done the same way, only the operation is easier, because dividing by two in the binary number system is carried out simply by dropping the LSB. Example: Average 0100 and 1100. Adding these two numbers yields 10000. Dropping the LSB gives 1000. Checking in decimal equivalents yields $4+12=16$; dividing by $2=8$, which is 1000 in binary.

Therefore, averaging two 8-bit video signals means simply applying the two numbers to an adder, getting a 9-bit sum due to a possible carry, and throwing away the LSB to get back to eight bits. The result is the average for the two signals.

Figure 4:
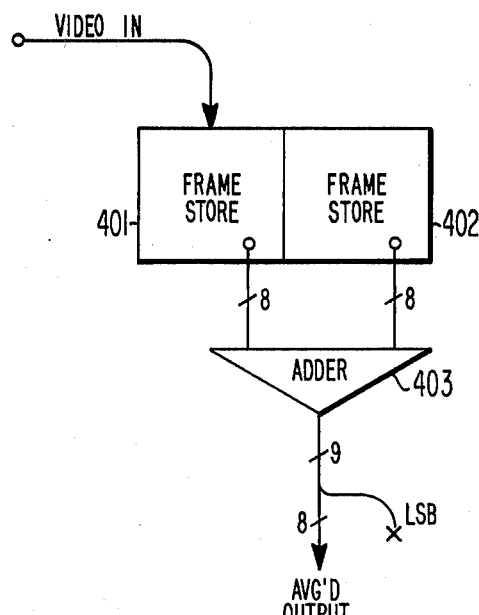
FIG. 4 is a tutorial diagram of binary averaging.

FIG. 4 is a tutorial figure showing this operation being done at the output of two frame stores 401 and 402. Note that for a stationary picture, the stream of bits to the inputs of adder 403 will be sample-for-sample identical, and the average will be identical to the input. If the picture is a moving object on a fixed background, the background will be unaffected by the averaging, but the moving object will be averaged into the background. This will tend to obscure motion discontinuities somewhat, but it also will tend to make double images out of fast moving objects, so the circuitry of FIG. 4 could not be left in a video path all the time.

The ideal averaging cover-up for motion discontinuities would do two things: (1) it would be used only when the drop was actually taking place, and (2) it would use as one of its averaging inputs the signal from the dropped frame. The arrangement of FIG. 5 does exactly that.

Figure 5:
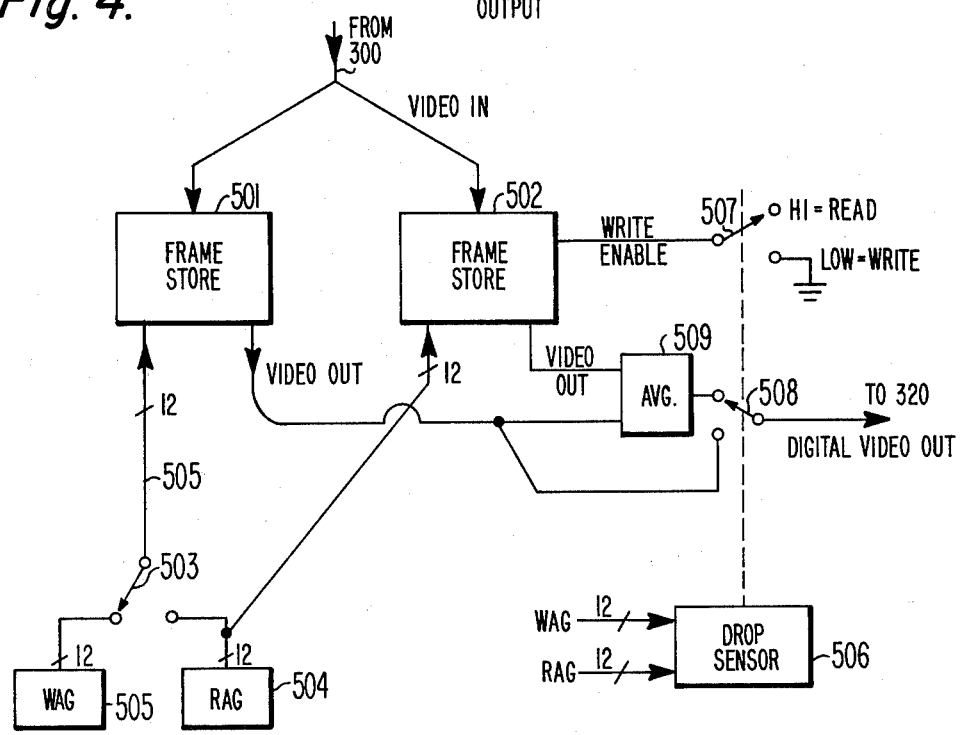
FIG. 5 is a block diagram of an alternate embodiment of the synchronizer.

In FIG. 5, the synchronizer 26 uses two frame stores, labelled 501 and 502. Frame store 501 functions exactly as frame stores have done in prior art synchronizers; it alternates by using switch 503 between having RAG 504 and WAG 505 coupled to its 12-bit address line 505, to give an effective simultaneous reading and writing. (This is accomplished by having input and output buffers, not shown, to store incoming video briefly while the memory is reading, and another buffer to store outgoing video while the memory is writing.) In most synchronizers, the switch 503 alternates very rapidly between RAG and WAG.

However, frame store 502 is tied directly to RAG 504, and operates continuously using READ addresses. Notice though, it normally writes using READ addresses. To enable the write mode, switch 507 is in the grounded position.

By looking back at FIG. 2(a), one can see that store 502 will usually write a "split" of parts of two successive frames, which is useless. However, when the RAG 504 is causing output frame 24 to be read out of the store 501, the input signal to store 502 consists solely of input frame 25, the frame that is destined to be dropped for a 4% fast video input signal. Input frame 25, the dropped frame, is therefore stored in store 502.

The fact that the read and write addresses are now the same is then sensed (by comparing WAG/RAG addresses in drop sensor 506) and drop sensor 506 provides a drop signal to switches 507 and 508. These switches are both thrown to the high position shown in FIG. 5, thereby converting store 502 to read (for one frame only) and converting the video output from switch 508 to averaged output from averaging circuit 509 (also for one frame). Since input frame 26 is now coming into store 501, and almost immediately coming out again to make output frame 25 (see FIG. 2(a)), and since input frame 25 is coming from store 502, the output of averaging circuit 509 will be the average of the next input frame 26 and then dropped input frame 25. If there was no motion between input frames 25 and 26, the average will be identical to either one. If there was motion between the two frames, then the averaged output will contain an interpolated image which will tend to make the discontinuity much less visible. If the motion was rapid enough to give a double image, one of the double images will fall right where input frame 25 would have put it, thus greatly reducing any effect of motion discontinuity.

Figure 6:
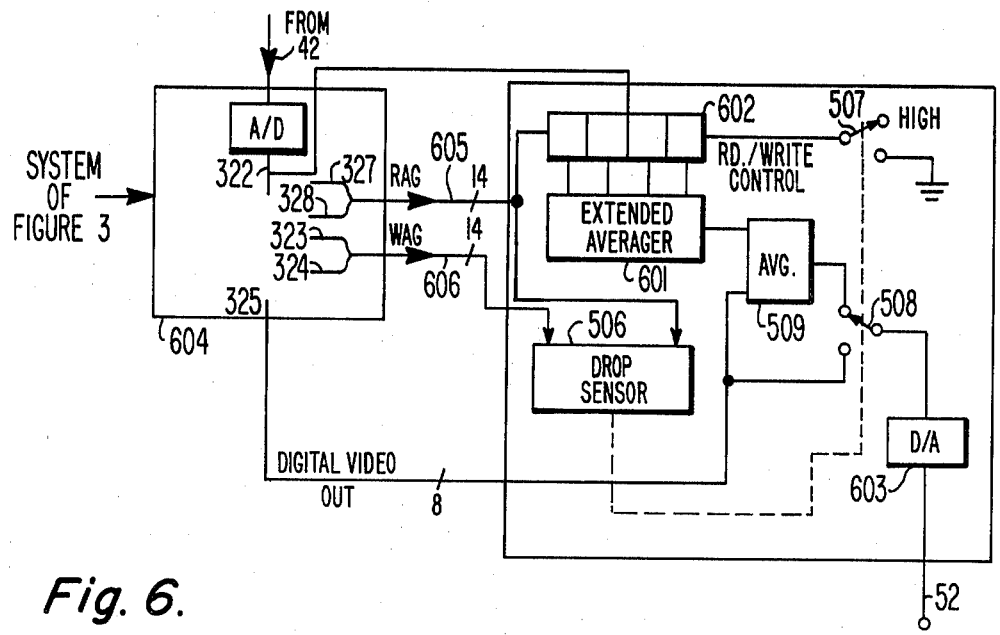
FIG. 6 is a block diagram of another alternate embodiment of the synchronizer.

FIG. 6 shows how to combine the two approaches of FIGS. 3 and 5, respectively, to have the best of both approaches. FIG. 6 is merely FIG. 5 drawn with store 501, WAG 505 and RAG 504, replaced with the entire system of FIG. 3 called 604 in FIG. 6. Internal connections to 604 are numbered in FIG. 6 with numbers corresponding to the numbers used in FIG. 3. Store 502 of FIG. 5 is replaced by a four-frame store 602 and extended averager 601. The operation of the system is then in complete parallel to FIG. 5. However, the system of FIG. 6 gives two chances to solve the problem. If the system of FIG. 6 finds two identical frames within its alloted time, (e.g. within 100 frames at a 4% rate), it makes a perfect juncture, and the auxiliary store 602 is not needed. This is done with switches 507 and 508 in their lower (not shown) position, and thus line 305 of the system 604 of FIG. 3 is coupled to D/A converter 603. If system 604 passes to the limit of its store without finding identical frames, then a drop sensor 506 on WAG and RAG busses 605 and 606, respectively, signals a four-frame drop, throws the switches as shown in FIG. 6, and averager 601 interpolates an average of the four dropped frames. This four frame average is in turn averaged by averager 509 with the digital signal on line 305. The resulting five frame average is applied to D/A converter 603.

Up to this point, nothing has been said about the reproduced audio. Under the circumstances of a moderate change in playback rate from a standard speed, the audio coming from the tape will simply be raised or lowered proportionately in pitch. The ear is very tolerant of such a change; it is common practice in European TV to show 24-frame-per-second movie film at 25 frames per second, thereby causing a 4% upward shift in all audio pitches. Since a 6% change represents roughly a half-tone on a piano keyboard, most changes which would be called for in such a device as this invention would be well tolerated. When larger changes are required, a technique similar to that applied to the video can be applied to the reproduced audio, whereby certain segments would be dropped or repeated to effectively stretch or shrink the audio times and hence restore the audio pitch to its proper values. Techniques using bucket brigade delay lines are known for doing this.

Figure 7:
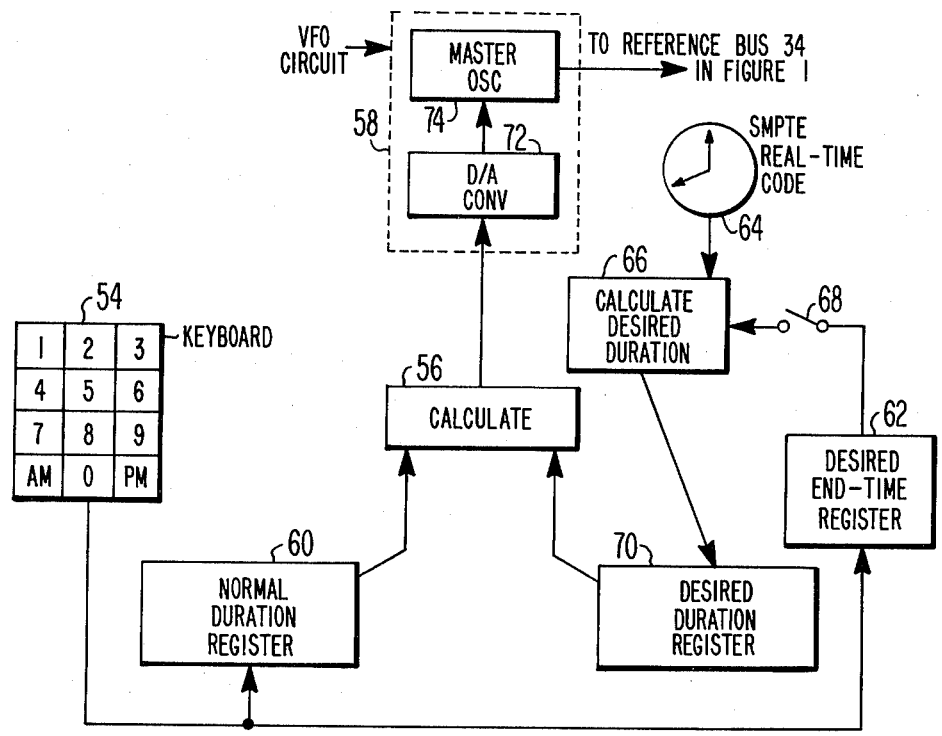
FIG. 7 is a second embodiment of the invention for real time entry.

Sometimes a program will start late, e.g., because of a late breaking news story that is broadcast before the start of the program. In order to have the program end at what would have been its normal real (wall clock) time, the operator must enter (using keyboard 54) both the normal and desired durations. The operator knows normal duration as it is written on the prerecorded program reel. However, in the arrangement of FIG. 1 the desired duration must be obtained by subtracting the length of the news broadcast from the normal duration, which may be done erroneously. FIG. 7 shows a modification of the speed control circuit 24 of FIG. 1 for real time control of the invention.

Real time is continuously provided by clock 64 to calculator 66. The time can be in the form of the SMPTE time code, but other convenient codes can be used. The keyboard 58 is similar to the keyboard 58 of FIG. 1 except for the addition of "AM" and "PM" keys. The operator first enters on keyboard 54 the normal running time, and this information is stored in normal duration register 60. The operator then enters desired real end time on keyboard 54 and this information is stored in desired end time register 62. Next a play switch 68 is closed and the information in register 62 is transferred to calculator 66 where the difference between end time and real time is calculated, thus eliminating mentally computing this difference or using a hand calculator with the possible errors arising from such computation. Therefore, calculator 62 can be an ALU operating as a subtractor. The calculated difference is the desired duration, and it is stored in desired duration register 70. The calculator 56 receives the normal and desired duration information from registers 60 and 70, respectively, and calculates their ratio. Calculator 56 can be an ALU operating as a divider. The resulting digital ratio signal is converted to an analog control signal by digital to analog converter 72 of VFO circuit 58 and the analog signal is coupled to master oscillator circuit 74. The output of oscillator 74 is applied to reference bus 34 of FIG. 1.

Assume that a one-hour tape must be run in 58.8 minutes, therefore, it must be run 2% fast. However, it has three 60-second commercial "cutaways" in it. (A "cutaway" is the technique of leaving the program source and going to another source to obtain a commercial message.) This is often done in program tapes by leaving 60 seconds of black video where the commercial should go. Another tape machine provides the commercial; the program tape is just allowed to run. Of course, precise cuing and switching is involved, but broadcasters are accustomed to such precise operations.

However, one can't run the commercial 2% faster, or the advertiser that bought 60 seconds of air time will complain that it's not receiving what it paid for.

Therefore, to keep the black inserts at a duration of exactly 60 seconds, the program VTR must come out of the time changing mode for exactly 60 seconds, while the commercial message runs, and then the program VTR must go back in to the time changing mode. However, it fell behind during those 60 seconds of normal running, and must go back to the time changing mode running slightly faster. If there are several cutaways in a program tape, as there normally are, every time the program VTR goes back into the time changing mode the speed must be further increased as compared to the speed used before the 60-second black video insert to make up for the progressively increasing cumulative time lost at each cutaway.

Figure 8:
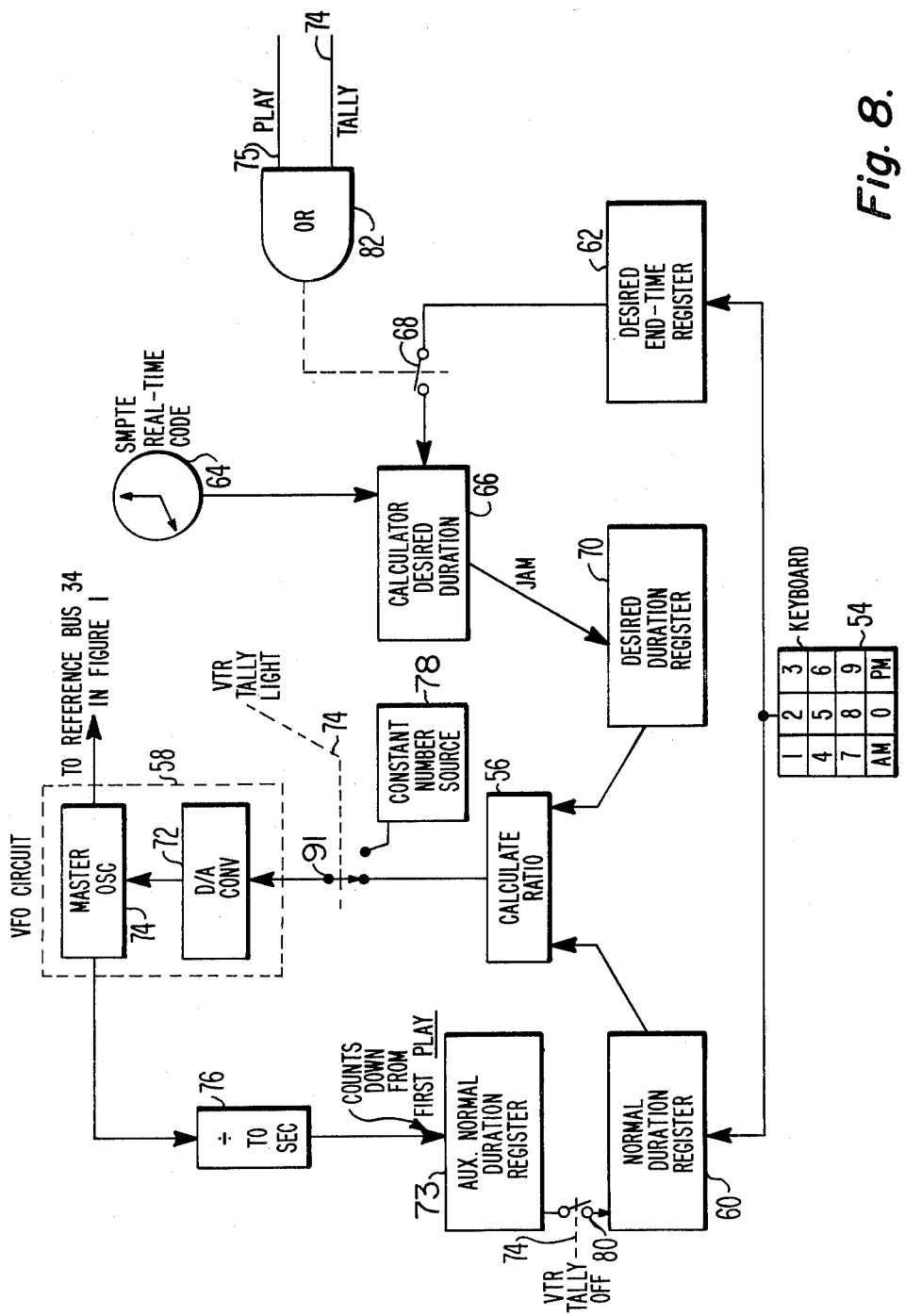
FIG. 8 is a block diagram of an embodiment of the invention useable with commercial cutaways.

FIG. 8 shows an embodiment of the invention for achieving the above-described operation. The operation starts out identical to that of FIG. 7. The operator enters the tape's duration and the desired end time into registers 60 and 62, respectively, and the automatic calculation proceeds as for FIG. 1.

However, as soon as the operator pressed PLAY, one additional thing happened: the contents of the normal duration register 60 are transferred to another memory, called the auxiliary normal duration register 73 by switch 80 that is ganged to switch 68. Now, for every second the tape plays, the number stored in the auxiliary normal duration register 73 is down-counted by one count, representing one second. This register 73 therefore keeps track of how much time is left on the tape, i.e. the remaining duration. Also, note that the once-per-second pulses that down-counts the remaining-duration number in register 73 are derived by divider 76 from the master oscillator 74 that determines how fast the tape runs. Since the tape is not running at a standard speed, the once-per-second pulses do not occur exactly at this once-per-second rate. If the tape is being forced to run fast, the seconds down counted off the remaining duration number in register 73 are down counted just a little faster than once-per-second. This means that the remaining duration number is exactly right, no matter how fast the tape is running. Conversely, if the tape is running at a slower than normal speed, the down counting proceeds slower than once-per-second and again the remaining duration number is correct.

When the first 60-seconds of black cutaway appears, the program machine immediately goes off air (though it keeps running), and the commercial machine goes on the air. The first thing that must be done is to set the master oscillator of FIG. 8 to normal frequency so that the program machines runs at normal speed during the sixty seconds that the program machine is off air. This is done by using the tally light line 74 to flip the switch 91 to the position not shown so D/A converter 72 is coupled to a fixed number source 78 which number will force the oscillator to the normal (non-fast) frequency. Now the program machine and the commercial-insert machine are both running at the same speed. (A tally light line goes high when a particular machine is on the air.)

At the end of the commercial, the program machine goes on the air again. As soon as the tally light goes on, the contents of the auxiliary normal duration register 73 are transferred into the normal duration register 60 by switch 80. One can consider this time at the end of the commercial just as if one were starting another tape whose normal duration is the one just put into the normal duration register 60.

The desired end time hasn't changed, and is still in the desired end-time register 62. OR gate 82 receives both PLAY and TALLY signals on lines 75 and 74, respectively, to actuate the enable calculation switch 68 at the right of FIG. 8. When TALLY line 74 goes HIGH, the desired end time in register 62 is again compared with the new time of day, and a new desired duration is calculated by ALU 66. Calculator 56 now takes the ratio of the number in desired duration register 70 and the number in normal duration register 60, and this new ratio is transferred to the master oscillator 74 (switch 91 being in the position shown) to make it run slightly faster to compensate for the 60-second slow-down during the commercial.

Figure 9:
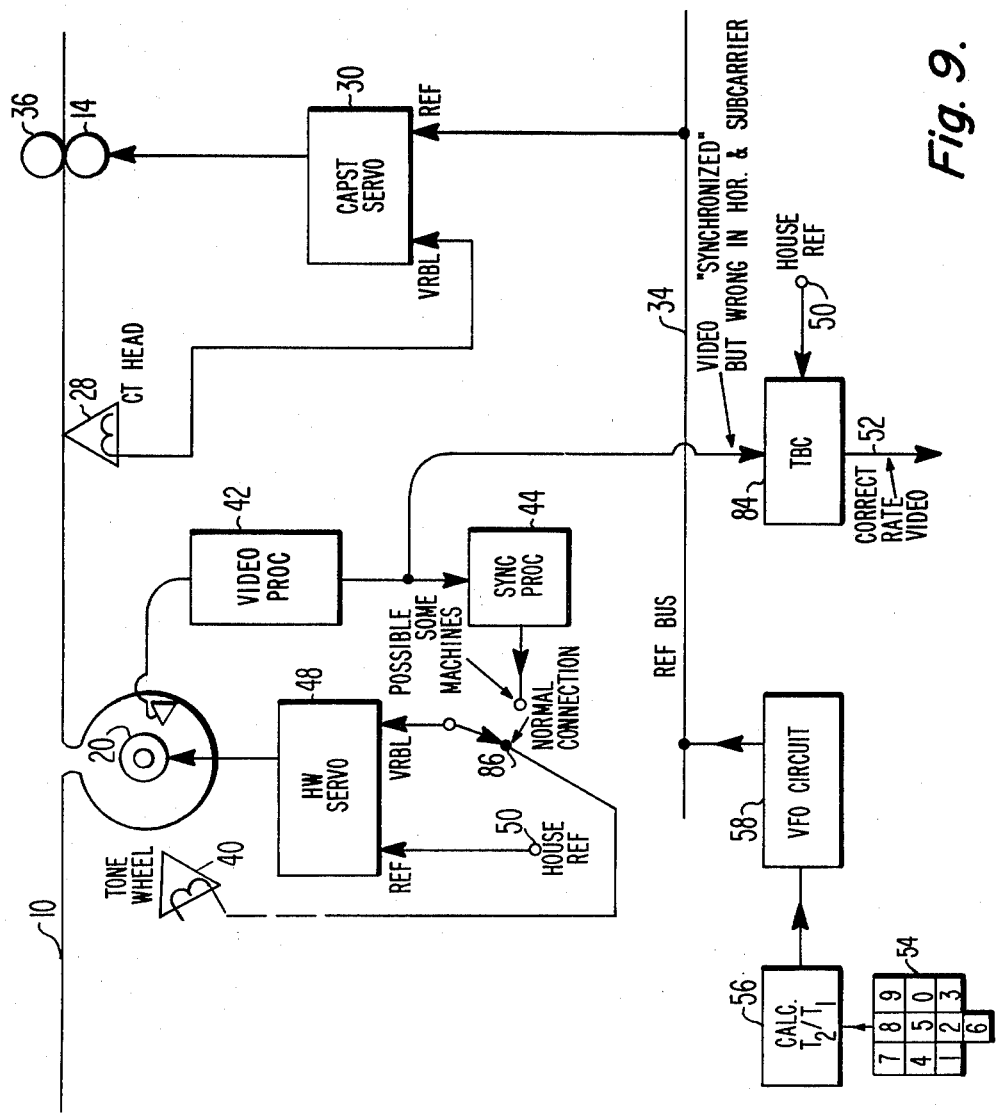
FIG. 9 is a block diagram of a third embodiment of the invention for use with a helical scan VTR.

FIG. 9 shows an embodiment of the invention for use with a helical VTR. It is similar to the embodiment of FIG. 1 for quadruplex machines. The major difference lies in the fact that the tape itself, in a non-segmented machine, can be used as a frame store, simply by running the headwheel at the proper speed, and slowing down or speeding up the capstan. The loss of tracking is compensated for by a vibrating head as known in the art.

The resulting video is correct in basic frame rate, since the frame rate is determined by the revolution rate of the headwheel, which is kept locked to house reference. However, since the actual head-to-tape speed in a helical machine is composed of a vector sum of the tip rotational speed and the capstan speed, the various frequencies—subcarrier, horizontal, FM—all come out slightly wrong. The FM errors are accommodated by a wide range demodulator; the synchronization signal frequency errors, though, must be accommodated by time-base corrector 84, as known in the art.

Normally, the headwheel servo runs with its tonewheel as the variable; in some machines and circumstances, tape itself may be used as the reference, for small variations in capstan speed. Switch 86 can select between these inputs.

What is claimed is:

1. A method for controlling the playback speed of a video tape recorder to conform to a selected speed different from a recording speed, said method comprising generating a signal having a frequency in accordance with said selected playback speed, applying said signal as a reference signal to a servo circuit, providing an output signal from said servo circuit for control of said playback speed to conform to said selected speed, whereby a reproduced video signal recorded in accordance with a frame rate no longer conforms to said frame rate, and converting the reproduced video signal to conform to a selected frame rate, said generating step comprising calculating the quotient of a normal playback time of a length of video tape to a desired playback time for said length, and controlling the frequency of an oscillator in accordance with said quotient.

2. A method as claimed in claim 1, wherein said providing step comprises applying said output signal to a capstan motor.

3. A method as claimed in claim 1, wherein said video signal comprises a plurality of frames, and said converting step comprises detecting substantially identical frames, and repeating or deleting at least one frame when frames are substantially identical.

4. An apparatus for controlling the playback speed of a video tape recorder to conform to a selected speed different from a recording speed, said apparatus comprising means for generating a signal having a frequency in accordance with said selected playback speed, a servo circuit, means for applying said signal as a reference signal to said servo circuit, said servo circuit providing an output signal for control of said playback speed to conform to said selected speed, whereby a reproduced video signal recorded in accordance with a frame rate no longer conforms to said frame rate, and means for converting the reproduced video signal to conform to a selected frame rate, said generating means comprising means for calculating the quotient of a normal playback time of a length of video tape to a desired playback time, an oscillator means for providing said reference signal, and means for controlling the frequency of said oscillator means in accordance with said quotient.

5. An apparatus as claimed in claim 4, further comprising a capstan motor that receives said output signal.

6. An apparatus as claimed in claim 4, wherein said video signal comprises a plurality of frames, and said converting means comprises means for detecting substantially identical frames, and means for repeating or deleting at least one frame when frames are substantially identical.

7. A method for controlling the playback speed of a video tape recorder to conform to a selected speed different from a recording speed, said method comprising generating a signal having a frequency in accordance with said selected playback speed, applying said signal as a reference signal to a servo circuit, providing an output signal from said servo circuit for control of said playback speed to conform to said selected speed, whereby a reproduced video signal recorded in accordance with a frame rate no longer conforms to said frame rate, and converting the reproduced video signal to conform to a selected frame rate, said generating step comprising calculating desired playback time of a length of video tape using end and real times of said length, calculating the quotient of normal playback time to desired playback time, and controlling the frequency of an oscillator in accordance with said quotient.

8. A method as claimed in claim 7, further comprising generating and storing a signal representing said normal playback time, subtracting from said stored normal playback time signal a signal derived from said oscillator to form a difference signal, and substituting the difference signal for the original normal playback time signal in said last recited calculating step.

9. An apparatus for controlling the playback speed of a video tape recorder to conform to a selected speed different from a recording speed, said apparatus comprising means for generating a signal having a frequency in accordance with said selected playback speed, a servo circuit, means for applying said signal as a reference signal to said servo circuit, said servo circuit providing an output signal for control of said playback speed to conform to said selected speed, whereby a reproduced video signal recorded in accordance with a frame rate no longer conforms to said frame rate, and means for converting the reproduced video signal to conform to a selected frame rate, said generating means comprising means for calculating desired playback time of a length of video tape using said end and real times of said length, means for calculating the quotient of normal playback time to desired playback time, an oscillator means for providing said reference signal, and means for controlling the frequency of said oscillator means in accordance with said quotient.

10. An apparatus as claimed in claim 9, further comprising means for generating and storing a signal representing said normal playback time, means for deriving a signal from said oscillator means, means for subtracting from said stored normal playback time signal said derived signal to form a difference signal, and means for substituting the difference signal for the original normal playback time signal in said last recited calculating means.

* * * * *